US012572820B2

(12) United States Patent　　　　(10) Patent No.:　　US 12,572,820 B2

Choudhary et al.　　　　　　　　　(45) Date of Patent:　　Mar. 10, 2026

(54) METHODS AND SYSTEMS FOR GENERATING KNOWLEDGE GRAPHS FROM PROGRAM SOURCE CODE

(71) Applicant: INTUIT INC., Mountain View, CA (US)

(72) Inventors: Vikas Choudhary, Bangalore (IN); Harsh Mohan Modawel, Bangalore (IN); Vinoth Jeba Kumar Radha Krishnan, Bangalore (IN); Ganesh Bhat, Mississauga (CA)

(73) Assignee: INTUIT INC., Mountain View, CA (US)

( * ) Notice: Subject to any disclaimer, the term of this patent is extended or adjusted under 35 U.S.C. 154(b) by 1196 days.

(21) Appl. No.: 17/011,734

(22) Filed: Sep. 3, 2020

(65) Prior Publication Data

US 2022/0067538 A1　　Mar. 3, 2022

(51) Int. Cl.
*G06N 5/02*　　　　(2023.01)
*G06F 8/41*　　　　(2018.01)
*G06F 18/20*　　　 (2023.01)
*G06F 18/214*　　 (2023.01)

(52) U.S. Cl.
CPC ............... *G06N 5/02* (2013.01); *G06F 8/433* (2013.01); *G06F 18/214* (2023.01); *G06F 18/29* (2023.01)

(58) Field of Classification Search
CPC ......... G06N 5/02; G06F 8/433; G06F 18/214; G06F 18/29
See application file for complete search history.

(56) References Cited

U.S. PATENT DOCUMENTS

| | | | | |
|---|---|---|---|---|
| 7,043,720 | B2 * | 5/2006 | Kuzmin | .................... G06F 8/33 |
| | | | | 717/136 |
| 9,026,903 | B1 * | 5/2015 | Michael | ............... G06F 40/154 |
| | | | | 715/235 |
| 10,416,972 | B1 * | 9/2019 | Forghani | .............. G06F 8/4441 |
| 10,534,604 | B1 * | 1/2020 | Kimball | ................. G06F 8/427 |
| 2009/0259454 | A1 * | 10/2009 | Adir | ..................... G06F 11/263 |
| | | | | 703/13 |
| 2012/0254665 | A1 * | 10/2012 | Pasala | ................ G06F 11/3684 |
| | | | | 714/33 |

(Continued)

OTHER PUBLICATIONS

Fechete et al., Generating Control Flow Graphs for Ada Programs, Sep. 2007, 48 pages (Year: 2007).*

*Primary Examiner* — Omar F Fernandez Rivas
*Assistant Examiner* — Tri T Nguyen
(74) *Attorney, Agent, or Firm* — Patterson + Sheridan, LLP

(57)　　　　　ABSTRACT

Certain aspects of the present disclosure provide techniques for generating knowledge graphs from program source code. An example method generally includes receiving a source code definition of a workflow implemented in an application. The source code definition of the workflow is converted into an intermediate representation of the workflow, the intermediate representation comprising a condensed version of the source code definition. An abstract syntax tree representation of the workflow is generated based on the intermediate representation of the workflow. A structured file is generated by traversing the abstract syntax tree representation of the workflow, wherein the structured file comprises a definition of the workflow in a knowledge graph-specific language. The structured file is deployed to a knowledge graph execution engine.

20 Claims, 5 Drawing Sheets

(56)                    References Cited

U.S. PATENT DOCUMENTS

| | | | |
|---|---|---|---|
| 2014/0282424 A1* | 9/2014 | Sheridan ............ | G06F 11/3604 |
| | | | 717/127 |
| 2017/0091293 A1* | 3/2017 | Cummings ......... | G06F 16/3344 |
| 2017/0344349 A1* | 11/2017 | He .......................... | G06F 8/443 |
| 2018/0373986 A1* | 12/2018 | Rainwater ............. | G06N 20/00 |
| 2019/0303141 A1* | 10/2019 | Li ....................... | G06F 16/9024 |
| 2020/0042706 A1* | 2/2020 | Allen ........................ | G06F 8/10 |
| 2021/0056211 A1* | 2/2021 | Olson ...................... | G06N 3/08 |
| 2021/0240456 A1* | 8/2021 | Dwars ................ | G06F 9/30174 |
| 2021/0286718 A1* | 9/2021 | Ravindar ............... | G06F 8/443 |
| 2021/0318858 A1* | 10/2021 | Xu ..................... | G06F 11/3636 |
| 2022/0066752 A1* | 3/2022 | Zhang ..................... | G06N 3/02 |

* cited by examiner

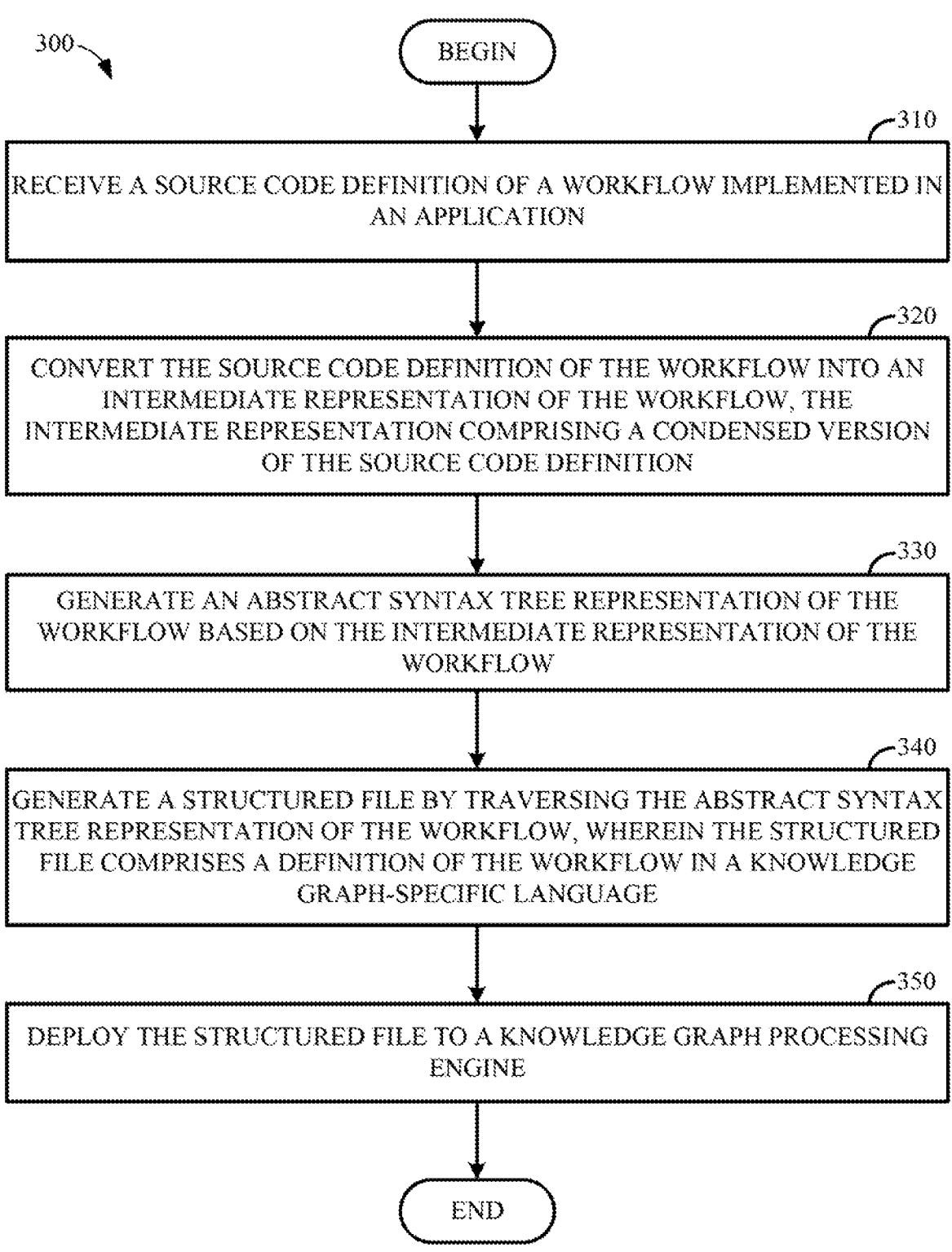

300

BEGIN

310

RECEIVE A SOURCE CODE DEFINITION OF A WORKFLOW IMPLEMENTED IN AN APPLICATION

320

CONVERT THE SOURCE CODE DEFINITION OF THE WORKFLOW INTO AN INTERMEDIATE REPRESENTATION OF THE WORKFLOW, THE INTERMEDIATE REPRESENTATION COMPRISING A CONDENSED VERSION OF THE SOURCE CODE DEFINITION

330

GENERATE AN ABSTRACT SYNTAX TREE REPRESENTATION OF THE WORKFLOW BASED ON THE INTERMEDIATE REPRESENTATION OF THE WORKFLOW

340

GENERATE A STRUCTURED FILE BY TRAVERSING THE ABSTRACT SYNTAX TREE REPRESENTATION OF THE WORKFLOW, WHEREIN THE STRUCTURED FILE COMPRISES A DEFINITION OF THE WORKFLOW IN A KNOWLEDGE GRAPH-SPECIFIC LANGUAGE

350

DEPLOY THE STRUCTURED FILE TO A KNOWLEDGE GRAPH PROCESSING ENGINE

END

FIG. 3

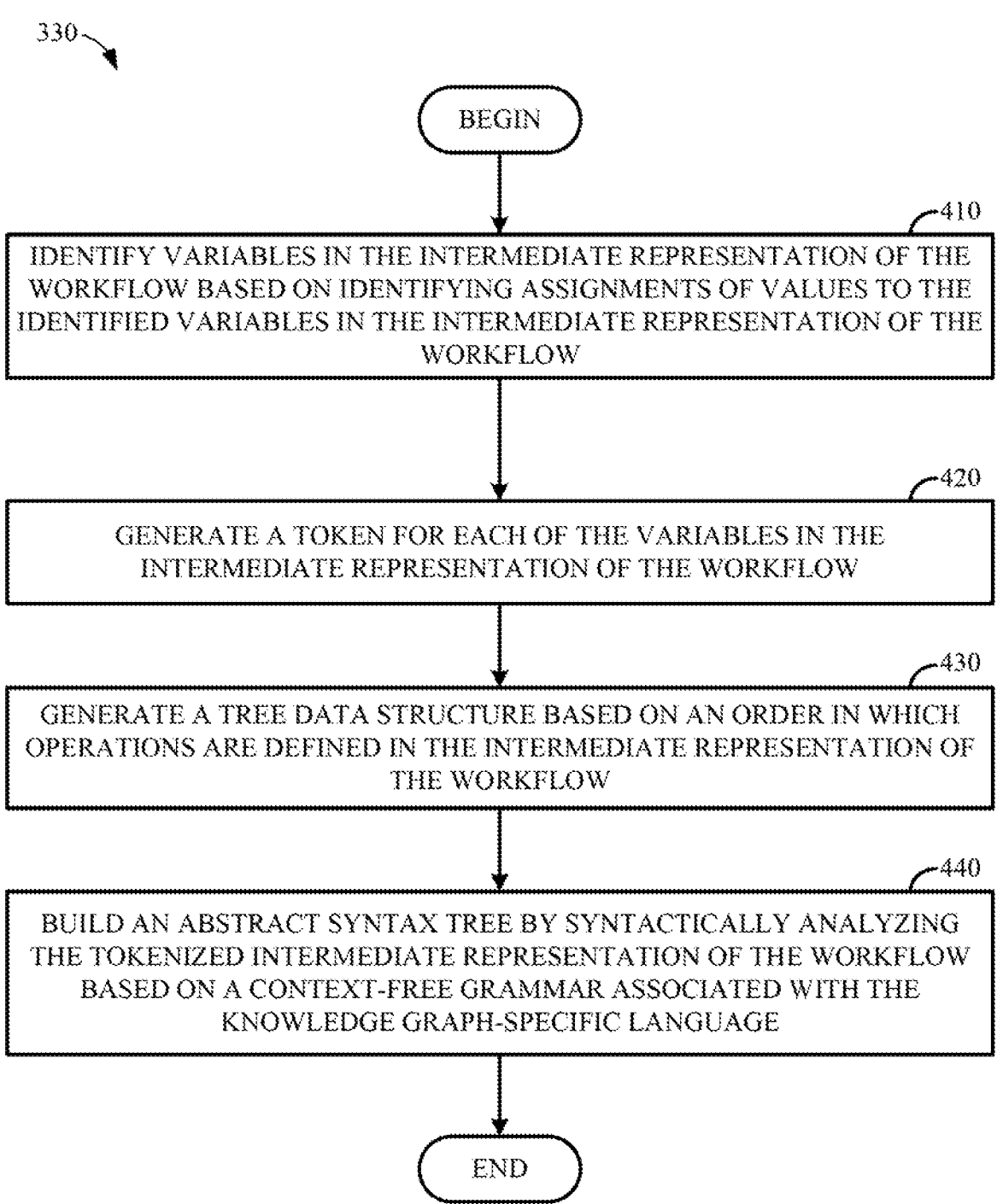

330

BEGIN

410

IDENTIFY VARIABLES IN THE INTERMEDIATE REPRESENTATION OF THE WORKFLOW BASED ON IDENTIFYING ASSIGNMENTS OF VALUES TO THE IDENTIFIED VARIABLES IN THE INTERMEDIATE REPRESENTATION OF THE WORKFLOW

420

GENERATE A TOKEN FOR EACH OF THE VARIABLES IN THE INTERMEDIATE REPRESENTATION OF THE WORKFLOW

430

GENERATE A TREE DATA STRUCTURE BASED ON AN ORDER IN WHICH OPERATIONS ARE DEFINED IN THE INTERMEDIATE REPRESENTATION OF THE WORKFLOW

440

BUILD AN ABSTRACT SYNTAX TREE BY SYNTACTICALLY ANALYZING THE TOKENIZED INTERMEDIATE REPRESENTATION OF THE WORKFLOW BASED ON A CONTEXT-FREE GRAMMAR ASSOCIATED WITH THE KNOWLEDGE GRAPH-SPECIFIC LANGUAGE

END

FIG. 4

METHODS AND SYSTEMS FOR GENERATING KNOWLEDGE GRAPHS FROM PROGRAM SOURCE CODE

Aspects of the present disclosure relate to generating knowledge graphs, and more specifically to compiling knowledge graphs executable by a knowledge graph execution engine from program source code that is written in a programming language.

BACKGROUND

Graph structures generally represent relationships between data and operations as connections between nodes in a graph, where the nodes represent data provided by a user of an application and/or operations performed by an application. These graph structures may be established as directed graphs, in which nodes representing inputs to a target node are connected to the target node using directional constructs, such as unidirectional arrows or connections that point from a source node to the target node. Because graphs can be used to define input and output relationships for a function in an application, graphs may be a useful mechanism by which an application can be defined.

In some cases, an application may be defined using a knowledge graph structure. In a knowledge graph structure, nodes in the knowledge graph may encode various rules for performing an operation. For example, a node may include rules that define required and optional inputs for a function and specify the output generated based on the required and optional inputs. Further, in the knowledge graph, nodes may be connected in a continuous path from a root node, which may represent the entry point into an operation or a series of related operations in an application, to a terminating node representing the final actions to be performed for and the results generated from executing the operation or series of related operations.

Legacy software applications may implement multiple workflows in application source code that specifically defines inputs into a workflow, rules for processing these inputs, and the output of the workflow. Because these workflows are generally implemented in source code written in one or more programming languages (e.g., C++, Java, Python, FORTRAN, assembly, etc.), modifying a workflow may require that a programmer is proficient in a language and can interpret the functionality implemented by the source code and any accompanying documentation. Because knowledge graphs may represent a more efficient, maintainable manner by which applications can be written and maintained, developers may wish to implement legacy software applications in knowledge graphs, which may allow for these workflows to be implemented as sets of rules interpreted and executed by a common execution engine. However, converting program source code for legacy software applications into knowledge graph definitions for the functionality implemented in these legacy software applications may be a difficult process needing expert knowledge of both the program source code and a knowledge graph-specific language used to define workflows for execution by a knowledge graph execution engine.

Accordingly, techniques are needed to accelerate the transformation of program source code into knowledge graph definitions that can be executed by a knowledge graph execution engine.

BRIEF SUMMARY

Certain embodiments provide a computer-implemented method for generating a knowledge graph definition from program source code. The method generally includes receiving a source code definition of a workflow implemented in an application. The source code definition of the workflow is converted into an intermediate representation of the workflow, the intermediate representation comprising a condensed version of the source code definition. An abstract syntax tree representation of the workflow is generated based on the intermediate representation of the workflow. A structured file is generated by traversing the abstract syntax tree representation of the workflow, wherein the structured file comprises a definition of the workflow in a knowledge graph-specific language. The structured file is deployed to a knowledge graph execution engine.

Other embodiments provide a system comprising a processor and a non-transitory computer-readable memory storing instructions that, when executed by the processor, perform an operation for generating a knowledge graph definition from program source code. The method generally includes receiving a source code definition of a workflow implemented in an application. The source code definition of the workflow is converted into an intermediate representation of the workflow, the intermediate representation comprising a condensed version of the source code definition. An abstract syntax tree representation of the workflow is generated based on the intermediate representation of the workflow. A structured file is generated by traversing the abstract syntax tree representation of the workflow, wherein the structured file comprises a definition of the workflow in a knowledge graph-specific language. The structured file is deployed to a knowledge graph execution engine.

Still further embodiments provide a computer-readable medium having instructions stored thereon which, when executed, performs an operation for generating a knowledge graph definition from program source code. The method generally includes receiving a source code definition of a workflow implemented in an application. The source code definition of the workflow is converted into an intermediate representation of the workflow, the intermediate representation comprising a condensed version of the source code definition. An abstract syntax tree representation of the workflow is generated based on the intermediate representation of the workflow by tokenizing the intermediate representation of the workflow based on a lexical analysis of the intermediate representation and building the abstract syntax tree by syntactically analyzing the tokenized intermediate representation of the workflow based on a context-free grammar associated with the knowledge graph-specific language to generate a tree data structure based on an order in which operations are defined in the intermediate representation of the workflow such that an output of a function is represented as a root node of the abstract syntax tree. The nodes in the tree data structure may represent an operation of a plurality of operations defined in the context-free grammar associated with the knowledge graph-specific language, and the plurality of operations may comprise mathematical primitive operations/logical operations/conditional operations defined in a programming language and function calls in the application. A structured file is generated by traversing the abstract syntax tree representation of the workflow, wherein the structured file comprises a definition of the workflow in a knowledge graph-specific language. The structured file is deployed to a knowledge graph processing engine.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates example operations for generating a knowledge graph definition of a workflow from a source code definition of the workflow.

FIG. 4 illustrates example operations for generating an abstract syntax tree definition, used in generating the knowledge graph definition of a workflow, of the program source code implementing the workflow

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
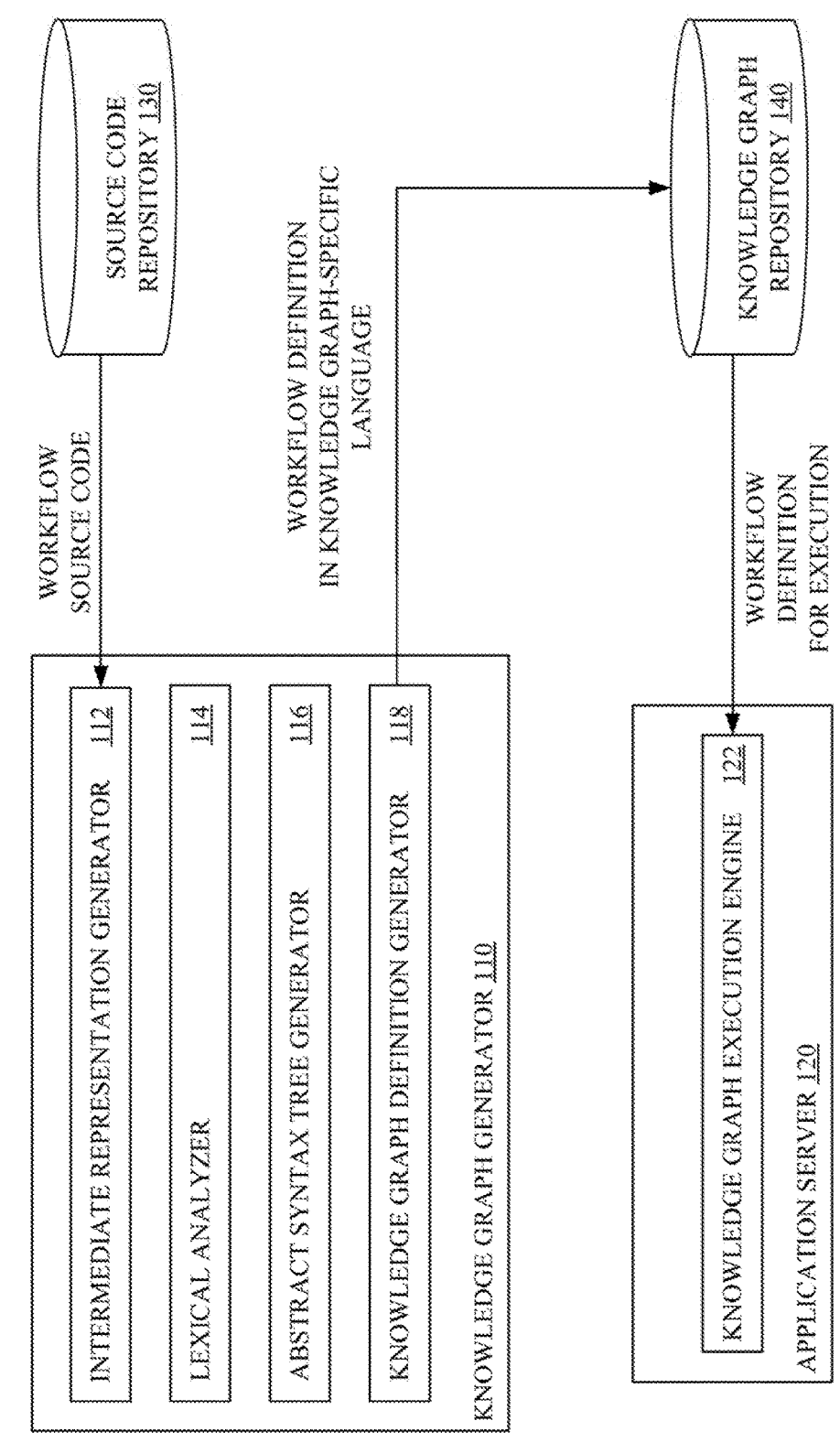
FIG. 1 depicts an example computing environment in which a knowledge graph definition of a workflow is generated from program source code implementing the workflow.

Knowledge graphs provide a way to describe operations in an application based on the inputs used by an operation and the rules implemented by the operation in order to generate an output.

For example, in an accounting application, a knowledge graph may define an operation for tracking accounts payable as a series of connected nodes encoding rules that, when executed, results in a summation of amounts in unpaid invoices received during a given time period. In another example, in a time tracking application, a knowledge graph may define an operation for tracking overtime for any given week as a series of connected nodes encoding rules that, when executed, results in a summation of hours worked for each day of a week, less an amount of time expected to be worked during that week. Because knowledge graphs describe operations in terms of inputs and rules applied to those inputs (and any intermediate calculations) to generate a result, knowledge graphs may be used in various applications to allow users to request the result of an operation, given some set of inputs.

Legacy applications may generally implement various workflows in source code written in a variety of programming languages, such as C++, FORTRAN, Pascal, Java, assembly, or other languages in which an application can be implemented. The source code implementing the workflow may, in some cases, be poorly documented or not documented at all, which may make interpreting and maintaining the source code difficult. Thus converting the program source code implementing a workflow into a knowledge graph definition may be a difficult and complex process.

The amount of time needed to convert an application to easily maintainable knowledge graph definitions that can be executed on a broadly applicable knowledge graph execution engine may be exacerbated by the number of workflows implemented in an application. For example, for an application implementing hundreds or thousands of discrete workflows, the amount of work needed to implement the workflows in the application in a knowledge graph may significantly delay future deployments of the application in a knowledge graph-based format. Further, the legacy application may need to be updated while workflows in the legacy application are being converted to knowledge graph definitions, which may further increase the amount of work involved in converting source code for these legacy applications to knowledge graph definitions.

Aspects of the present disclosure provide techniques for automatically generating knowledge graph definitions from program source code. Program source code written in various programming languages may implement a workflow in an application as a set of language-specific instructions that are compiled into machine code executable on a computing system. Because different workflows may be individually defined in specific programming languages according to the constraints of each programming language and may have varying levels of documentation that aid in understanding how a workflow is implemented, converting workflows from program source code to knowledge graph definitions may involve a significant amount of time and expert knowledge of both the language in which the program source code is written and the knowledge graph-specific language used to define workflows executable by a knowledge graph execution engine.

Generally, program source code may be ingested and converted into an abstract syntax tree representing the operation(s) implemented in the program source code. The abstract syntax tree may be traversed to generate a knowledge graph definition of the source code, which may be a declarative construct written in a structured language that defines the inputs into, operations of, and output of the workflow.

By automatically generating knowledge graph definitions from program source code, embodiments presented herein may allow for the compilation of program source code into declarative constructs that are decoupled from programmatic and platform-related constraints. These declarative constructs may be ingested by a knowledge graph engine that works across various platforms (e.g., native mobile and desktop platforms executing on different operating systems and processing architectures, web-based platforms, etc.), which may reduce the number of software artifacts to be generated and maintained to allow for execution of a workflow on different platforms. Further, the compilation of program source code into declarative constructs may accelerate the transition from source code-based workflow implementations to knowledge graph-based implementations of an application, accelerate implementation of changes to a workflow, and improve the ease of testing and debugging workflows implemented in application.

Example Generation of Knowledge Graphs from Program Source Code

FIG. 1 illustrates an example computing environment 100 in which program source code implementing a workflow in one or more programming languages is converted into a knowledge graph definition of the workflow.

As illustrated, computing environment 100 includes a knowledge graph generator 110, an application server 120, a source code repository 130, and a knowledge graph repository 140. Generally, as discussed in further detail below, knowledge graph generator 110 may use a compiler paradigm to generate a knowledge graph definition of a workflow from program source code. In this paradigm, program source code may be parsed into a tokenized format and analyzed syntactically to generate an abstract syntax tree representation of the program source code, which may then be traversed to generate a knowledge graph based on mappings between nodes in the abstract syntax tree and a knowledge graph-specific language. The abstract syntax tree representation of the program source code generally is a compact representation of the program source code that identifies relationships between different operations specified in the program source code in a hierarchical fashion such that the nodes on lower levels of the abstract syntax tree represent inputs into nodes (representing operations) on higher levels of the abstract syntax tree. Knowledge graph generator 110 can use this hierarchical structure to compile program source code into a knowledge graph such that the hierarchy of operations is preserved and execution of a workflow implemented by the knowledge graph is equivalent to execution of the workflow implemented by the program source code.

Knowledge graph generator 110 generally receives source code implementing a workflow as an input and generates a knowledge graph definition of the workflow as an output (with references to other workflow included as needed based on the received source code). The knowledge graph definition may be deployed to a knowledge graph repository (e.g., knowledge graph repository 140 illustrated in FIG. 1) and executed by an application server hosting a knowledge graph execution engine (e.g., knowledge graph execution engine 122 of application server 120). As illustrated, knowledge graph generator 110 may include an intermediate representation generator 112, a lexical analyzer 114, an abstract syntax tree generator 116, and a knowledge graph definition generator 118.

Intermediate representation generator 112 generally receives workflow source code written in one or more programming languages as an input and converts the received workflow source code into an intermediate representation that can be used to generate an abstract syntax tree representation of the workflow. Generally, the intermediate representation of the workflow source code generated by intermediate representation generator 112 may be a simplified version of the computer program code in which programming language-specific constructs are removed.

For example, intermediate representation generator 112 may be configured to remove or replace macros, routines, subroutines, or the like in program source code. These macros, routines, subroutines, or the like may be, for example, named fragments of code that represent data or operations in program source code (e.g., #define statements that identify object-like macros or function-like macros). For macros that represent data, intermediate representation generator 112 can replace the macro with an assignment operation. For macros that represent operations in program source code, intermediate representation generator 112 can replace the macro with a reference to another function or remove the macro altogether.

Other programmatic constructs, such as variable types and loops, may also be removed from the workflow source code by intermediate representation generator 112. For example, a knowledge graph engine may not be implemented in a strictly-typed programming language, and thus, distinctions between long and short versions of a data type may be irrelevant (e.g., a 64-bit long integer may be treated similarly to a 16 bit short integer, and thus, both may be treated as a regular integer). Loops may be removed from the workflow source code, as looping may be inherently supported by a knowledge graph execution engine 122 through execution of a portion of a workflow multiple times. For example, loops may be removed from workflow source code because knowledge graph execution engine 122 may process multicopy data (e.g., lists, arrays, or other data structures for which processing in a loop may be used) in a manner that allows for the same knowledge graph to work on a single copy data (e.g., single instances of a data type) and multicopy data.

In some embodiments, intermediate representation generator 112 may additionally add labeling or other information to the workflow source code that may be used in generating the knowledge graph definition of the workflow source code. For example, declarations and function calls may be labeled with names of nodes that may be generated in a knowledge graph. As discussed in further detail below, a reference to a node in a knowledge graph may indicate, for example, that the output of a function or a declared variable (or constant) may be an input into another operation in the knowledge graph.

In some embodiments, intermediate representation generator 112 may modify the workflow source code such that a value is written to a variable once in the intermediate representation of the workflow source code.

For example, assume that a workflow source code file includes two assignments to the variable foo: foo=bar*2; and foo=foo+bar. In some knowledge graph execution engines, a rule may be established that a variable can only be assigned a value once during the execution of an operation through a knowledge graph definition. Thus, until the final assignment of a value to the variable foo, intermediate representation generator 112 can generate one or more temporary variables to comply with the variable assignment rule. In this example, thus, intermediate representation generator 112 can rewrite the workflow source code file to include the assignments: temp1=bar*2; and foo=temp1+bar. Intermediate representation generator 112 may also generate one or more output variables to the workflow source code representing various outputs of an application to comply with the variable assignment rule.

In some embodiments, intermediate representation generator 112 may also generate the intermediate representation of the workflow source code by removing code that does not affect the output of the workflow source code. For example, if the workflow source code is written as a monolithic construct in which values are calculated and output for display, the lines of code dedicated to outputting values for display may be deemed irrelevant to the output generated by the workflow source code (as the knowledge graph execution engine 122 may already implement its own graphical output code). Thus, intermediate representation generator 112 may strip the graphical output code from the workflow source code in order to build the intermediate representation of the workflow source code.

For example, suppose that the workflow source code includes the instruction: cout << foo;, which represents an instruction to write the value foo to a console. Because writing the value of foo to a console does not have any bearing on the actual values generated by the workflow source code, intermediate representation generator 112 may remove this instruction from the workflow source code, which may compact the workflow source code and aid in accelerating the transformation of the workflow source code to a knowledge graph definition of the workflow.

After intermediate representation generator 112 pre-processes the workflow source code to generate the intermediate representation of the workflow source code, lexical analyzer 114 can tokenize the intermediate representation into a format that abstract syntax tree generator 116 can use to generate an abstract syntax tree representation of the workflow source code. Generally, lexical analyzer 114 may be configured to identify variables in the intermediate representation of the workflow source code and replace each variable with a token that represents that variable. Tokenizing variables may simplify the process of generating an abstract syntax tree representation of the workflow source code by constraining the universe of characters that used to generate the abstract syntax tree representation of the workflow source code. Variables may be easily identified using, for example, regular expression matching, as strings of characters following a particular pattern (e.g., "idX", where X represents a sequential number), while operations may be identified by predefined characters (e.g., for mathematical primitive operations, comparison operations, logical operations, etc.) or function names.

To tokenize the intermediate representation of the workflow source code, lexical analyzer 114 can process the intermediate representation of the workflow source code through a regular expression analysis that attempts to identify variables in the intermediate representation of the workflow source code (as opposed to function calls, mathematical operators, comparison operators, or logical operators in the workflow source code). The tokens generated by lexical analyzer 114 may be, for example, tokens having sequentially generated names that are associated with variables in the workflow source code.

Abstract syntax tree generator 116 generally uses the tokenized version of the intermediate representation of the workflow source code to generate an abstract syntax tree representation of the workflow source code in memory. Abstract syntax tree generator 116 may, in some embodiments, be implemented as a compiler written in Yet Another Compiler Compiler (YACC) and implement a context-free grammar having a plurality of rules that are used to generate the abstract syntax tree representation of the workflow source code.

Generally, the abstract syntax tree generated by abstract syntax tree generator 116 may be a tree representation of the syntactic structure of the intermediate representation of the workflow source code having a root node and one or more leaf nodes. The root node may represent the output of the workflow source code, and each leaf node may represent a variable used in generating the output of the workflow source code. Non-leaf nodes may represent operations performed in generating the output of the workflow source code or a variable used in generating the output of the workflow source code.

To generate the abstract syntax tree representation of the workflow source code, abstract syntax tree generator 116 can use the tokens generated by lexical analyzer 114 and a context-free grammar to build a tree representation of the intermediate representation of the workflow source code. Generally, the context-free grammar may include a plurality of rules, and each rule in the context-free grammar may have an associated action. For example, the actions may represent operations defined in a programming language, such as mathematical operations (e.g., associated with the "+", "−", "*", "/", and "^" characters), comparison operations, logical operations, and the like, as well as knowledge graph-specific operations representing operations defined within a knowledge graph. The structure of the context-free grammar and the general structure of an abstract syntax tree may be used to ensure that the tree is acyclic (i.e., does not include any loops in which nodes in the tree are visited multiple times) and is a correct representation of the workflow source code.

Abstract syntax tree generator 116 may generate the abstract syntax tree representation of the workflow source code by parsing the tokens generated by lexical analyzer 114 and the program source code in a top-down manner (e.g., from the first line of the intermediate representation of the workflow source code to the last line of the workflow source code). In some embodiments, the abstract syntax tree may be generated by building successive sub-trees that represent different operations defined in the intermediate representation of the workflow source code until the ultimate root node of the abstract syntax tree is generated. Generally, this ultimate root node in the abstract syntax tree may represent the output of the workflow source code, and child nodes of the ultimate root node may represent data used or operations performed in order to generate the output of the workflow source code.

Knowledge graph definition generator 118 is generally configured to traverse the abstract syntax tree generated by abstract syntax tree generator 116 and output a structured file in a knowledge graph-specific language that represents the workflow source code. To generate the structured file in the knowledge graph-specific language, knowledge graph definition generator 118 can traverse the abstract syntax tree generated by abstract syntax tree generator 116 and translate each node in the abstract syntax tree into one or more elements in the structured file.

For example, given any node in the abstract syntax tree with a left child node and a right child node, knowledge graph definition generator 118 can generate one or more nodes in the structured file that reference the left and right nodes as inputs into the operation associated with the given node. Each operation may be thought of as its own graph structure, in which a root node represents the result of an operation, and the children nodes of the root node may represent inputs into the operation. The graph structure for an operation may include any number of children nodes (inputs); for example, graph structures for mathematical, logical, and comparison operations may include two nodes, while graph structures for functions invoked in the workflow source code may include a number of nodes corresponding to the number of inputs defined for the functions.

To generate the nodes in the structured file, knowledge graph definition generator 118 may use predefined mappings between the names of nodes and various operations supported by the knowledge graph execution engine.

For example, each node representing an operation in the knowledge graph definition of the workflow source code may be generated as one or more lines of eXtensible Markup Language (XML) code that is associated with a particular operation. These operations may be, for example, mathematical operations, logical operations, comparison operations, references to other operations in the knowledge graph, and the like, where child nodes represent inputs into an operation represented by a parent node.

Generally, knowledge graph definition generator 118 may operate recursively against the abstract syntax tree and generate the knowledge graph definition of the workflow source code by traversing the abstract syntax tree using a top-down traversal starting from the root node of the abstract syntax tree and in which the first action performed during traversal of the abstract syntax tree is with respect to nodes at the bottom of the abstract syntax tree. The bottom of the abstract syntax tree may represent initial operations that are to be performed in order to reach the result at the root node of the abstract syntax tree, and successive intermediate nodes in the abstract syntax tree may represent subsequent operations that are to be performed in order to reach the result at the root node of the abstract syntax tree. Because the abstract syntax tree may be generated using a one-assignment-per-variable configuration, the knowledge graph definition of the workflow source code generated by knowledge graph definition generator 118 may also adhere to the one-assignment-per-variable paradigm by incrementally generating temporary variables and inserting the temporary variables into the knowledge graph. The resulting knowledge graph definition may be a structured file that is functionally identical to the workflow source code received as input into knowledge graph generator 110, but is written in a knowledge graph-specific language. The knowledge graph-specific language may be a construct that is closer to a natural language representation of an operation than a programmatic definition of an operation written in a computer programming language.

In some embodiments, knowledge graph definition generator 118 may perform or allow a user to perform various post-processing operations on the knowledge graph definition of the workflow generated from the abstract syntax tree. For example, based on predefined mappings between labels in the workflow source code and a data model associated with the knowledge graph execution engine, knowledge graph definition generator 118 can replace or update labels (e.g., variable names) with the names of the corresponding elements in the data model. After knowledge graph definition generator 118 generates and processes the knowledge graph definition of the workflow source code, knowledge graph definition generator 118 can deploy the knowledge graph definition of the workflow source code to knowledge graph repository 140 for use by a knowledge graph execution engine 122 on an application server 120 for testing or deployment in a production version of a software application.

Application server 120 is generally representative of one or more physical or virtual computing devices which may serve an application or portions of an application to a requesting client device.

As illustrated, application server 120 includes a knowledge graph execution engine 122. Knowledge graph execution engine 122 uses the knowledge graph definitions of a workflow to prompt a user for various inputs that are needed to execute a workflow defined by a knowledge graph and generate an output of the workflow. Generally, knowledge graph execution engine 122 may be configured to parse a structured file in a knowledge graph-specific language to generate a graph identifying a the control flow of a workflow of an application, including where user-provided inputs are needed to perform a mathematical, logical, or comparison operation, where another function or operation in the knowledge graph is to be invoked, and what the ultimate output of the workflow is based on the user-provided inputs and the operations performed within the workflow. Notably, the operations performed by knowledge graph execution engine 122 are not hard-coded into the knowledge graph execution engine, but defined in the knowledge graph definition of a workflow being executed by the knowledge graph execution engine. By using a single knowledge graph execution engine to execute various workflows written in knowledge graph-specific languages, updates to a workflow may be made in a small number of localized files (e.g., in knowledge graph repository 140) rather than in application source code.

Example Generation of a Knowledge Graph from Program Source Code

Figure 2:
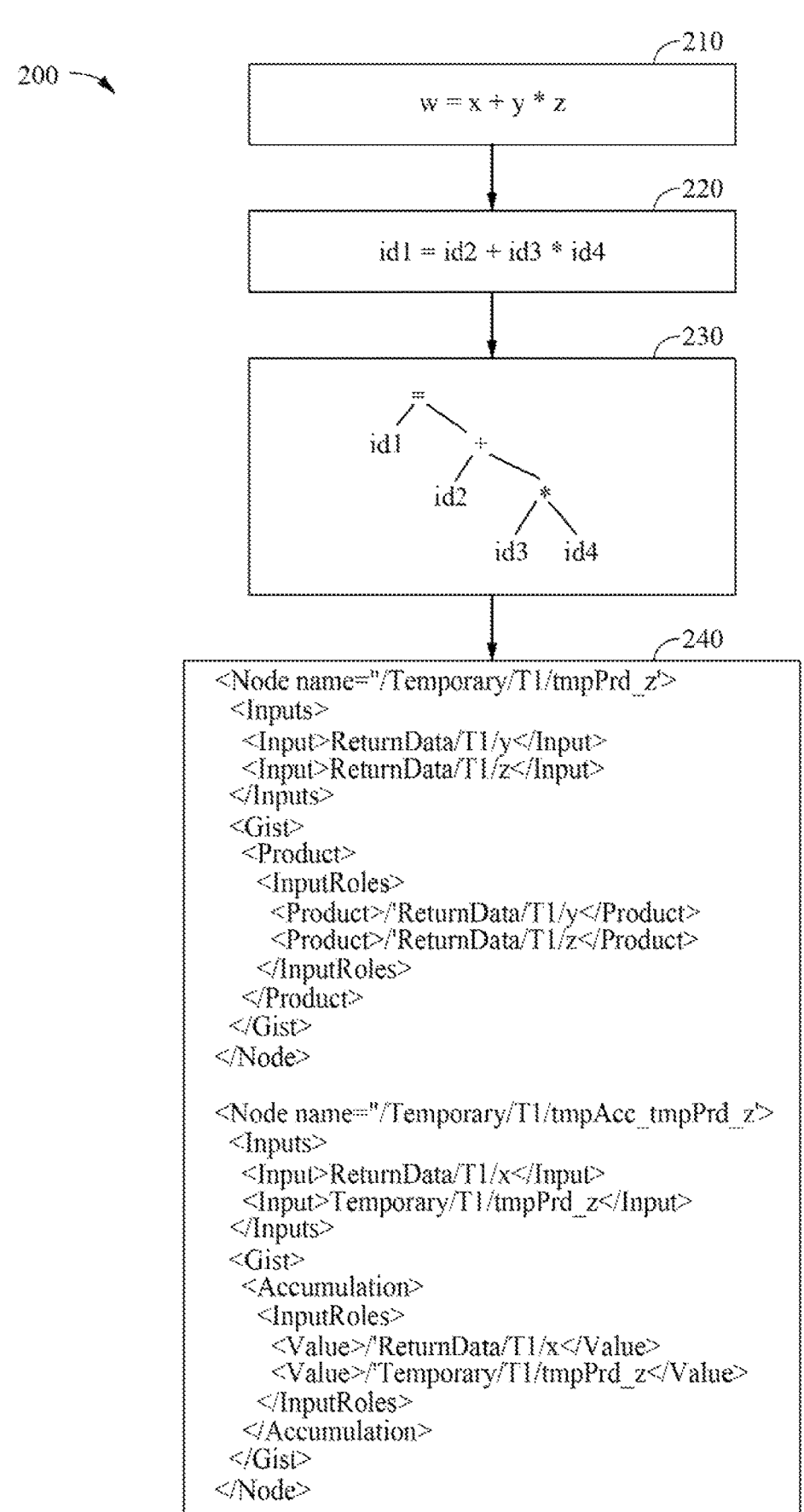
FIG. 2 illustrates an example transformation of program source code into a knowledge graph definition.

FIG. 2 illustrates an example transformation 200 of program source code into a knowledge graph definition of the operations represented by the program source code that may be performed by a knowledge graph generator (e.g., knowledge graph generator 110 illustrated in FIG. 1).

As illustrated, transformation 200 may begin with an input of a source code definition 210 of a workflow. In this example, the source code definition includes the single line of code: w=x+y*z. It should be understood, however, that source code of any length or complexity can be ingested into a knowledge graph generator.

To prepare the source code definition 210 for conversion into a knowledge graph, a knowledge graph generator can perform various pre-processing operations on the source code 210 to generate an intermediate representation of the source code. These pre-processing operations may include, for example, stripping programming language-specific constructs from the source code (e.g., macros), rewriting source code to remove loops from the source code, rewriting source code so that values are assigned to variables once in the source code, and the like.

After the program source code is transformed into an intermediate representation, a lexical analysis may be performed on the intermediate representation of the program source code to generate tokenized source code 220. In some embodiments, the lexical analysis may use regular expression matching or other pattern matching to identify variables in the source code and distinguish the variables in the source code from operations in the source code (e.g., mathematical operations, logical operations, comparison operations, function calls, etc.).

A lexical analysis may generate tokens for each variable found in the program source code, and each token may have a sequential name. For example, as illustrated in FIG. 2, the lexical analysis may determine that "w", "x", "y", and "z" represent variables in source code 210, and "=", "+", and "*" represent operations performed against these variables. The lexical analysis may thus generate tokens "id1", "id2", "id3", and "id4" for variables "w", "x", "y", and "z", respectively.

An abstract tree generator then uses the tokens in tokenized source code 220 and the intermediate representation of the source code generated from source code 210 to build an abstract syntax tree representation 230 of source code 210. The abstract syntax tree may be generated as a top-down construct, in which the highest level node of the abstract syntax tree representation 230 represents the first operation in source code 210 (i.e., the assignment of a value to the variable "w"), and lower level nodes in the abstract syntax tree representation 230 represent operations that are to be performed prior to executing the first operation in source code 210.

The abstract syntax tree representation 230 may be generated based on rules that associate various actions to various words in the source code. For example, the rules in the context-free grammar used by the abstract syntax tree generator may define the structure of specific nodes in the abstract syntax tree in terms of inputs and outputs. These rules may be defined for mathematical operations, logical operations, comparison operations, calls to other functions in the knowledge graph, and the like. As illustrated, the abstract syntax tree representation 230 generated from tokenized source code 220 and the intermediate representation of the source code generated from source code 210 may include a root node representing the assignment ("=") operation, with children nodes "id1" and the addition operation indicating that the value of the addition operation is assigned to "id1". The addition operation includes children nodes "id2" and the multiplication operation, indicating that the addition operation adds the values of "id2" and the multiplication operation. Finally, the multiplication operation includes the children nodes "id3" and "id4", indicating that the multiplication operation multiplies the values of "id3" and "id4".

A knowledge graph definition generator can then traverse the abstract syntax tree representation 230 to generate a workflow definition 240 in a knowledge graph-specific language that implements the operations of source code 210. To generate the workflow definition 240, the knowledge graph definition generator can traverse the abstract syntax tree representation 230 recursively until reaching the bottom of the abstract syntax tree representation. Once the knowledge graph definition generator reaches the bottom of the abstract syntax tree representation, the knowledge graph definition generator can identify operations that are to be invoked in the workflow and write a structured file from the bottom of the abstract syntax tree representation 230 to the root node of the abstract syntax tree representation 230. The knowledge graph definition generator can use, for example, templates associated with each operation in the knowledge graph to write the definition of each node in the workflow definition 240, such that the workflow definition 240 represents, in a declarative language, the operations implemented by source code 210.

Example Computer-Implemented Method for Generating Knowledge Graphs from Program Source Code FIG. 3 illustrates example operations 300 for generating a knowledge graph from program source code. The operations described herein may be performed, for example, by a knowledge graph generator (e.g., knowledge graph generator 110 illustrated in FIG. 1).

As illustrated, operations 300 begin at block 310, where a system receives a source code definition of a workflow implemented in an application. In various embodiments, the source code definition may be written in various programming languages, such as C++, FORTRAN, Pascal, Java, or the like, and include varying amounts of documentation that describe the operations implemented in the source code definition of the workflow.

At block 320, the system converts the source code definition of the workflow into an intermediate representation of the workflow. The intermediate representation of the workflow generally may be a condensed version of the source code definition.

In various embodiments, to convert the source code definition of the workflow into an intermediate representation, various pre-processing operations may be performed on the source code definition of the workflow to prepare the source code definition for conversion into an abstract syntax tree representation. These pre-processing operations may include, for example, removing programming language-specific constructs (e.g., macros, definitions, etc.) from the source code definition of the workflow, removing loop structures from the source code definition of the workflow, rewriting the source code definition such that values are assigned to a variable once, and the like. Generally, in rewriting the source code definition such that values are assigned to a variable once, the system can introduce various temporary variables that store the intermediate assignments to a variable and are used to generate the ultimate value of that variable in the source code.

At block 330, the system generates an abstract syntax tree representation of the workflow based on the intermediate representation of the workflow. As illustrated in further detail in FIG. 4 and described below, the intermediate representation of the workflow may be tokenized using a lexical analysis of the intermediate representation, and the tokens generated by the lexical analysis may be used in generating an abstract syntax tree representing the operations defined in the source code definition of the workflow. Generally, the abstract syntax tree may be generated as a tree data structure in which the root node of the tree represents the output of the workflow, and child nodes of the tree represent input data and/or various other operations defined in the workflow that are to be executed to generate the output of the workflow.

At block 340, the system generates a structured file by traversing the abstract syntax tree representation of the workflow. Generally, the structured file may include a definition of the workflow in a knowledge graph-specific language. The knowledge graph-specific language may be, for example, implemented as an eXtensible Markup Language schema defining structured language constructs for various operations that may be performed in executing the workflow. These language constructs may include definitions of nodes corresponding to mathematical operations, logical operations, comparison operations, and/or other functions in the knowledge graph invoked by a workflow.

In some embodiments, the structured file may be generated by translating nodes in the abstract syntax tree to nodes in a calculation graph. The nodes in the calculation graph may represent operations or inputs into an operation performed to execute the workflow.

In some embodiments, the system can generate structured file by recursively traversing the abstract syntax tree. The operations defined at a lowest level of the abstract syntax tree may be defined first in the structured file, and successively higher level operations in the abstract syntax tree may be defined later in the structured file. The last node defined in the structured file may be the root node of the abstract syntax tree, as the root node of the abstract syntax tree may generally represent the output of the workflow.

In some embodiments, the structured file may include labels associated with variables defined in the program source code. These labels may be replaced with corresponding labels in a data model associated with the knowledge graph execution engine so that the knowledge graph execution engine can parse the structured file and understand where data should be displayed and how data should be processed.

At block 350, the system deploys the structured file to a knowledge graph processing engine.

By generating knowledge graphs from program source code, embodiments described herein may allow for the transformation of platform-specific code (e.g., code for mobile or desktop environments targeting different operating systems and/or processing architectures) into declarative constructs that can be executed using a knowledge graph execution engine. Expert knowledge of a workflow, the programming language in which a workflow is implemented in program source code, and the knowledge graph-specific language may not be needed to rewrite workflows implemented in program source code into a knowledge graph definition of the workflow. Further, for applications including a large number of workflows defined in program source code, large amounts of program source code may be automatically and quickly compiled into knowledge graph definitions of the workflows implemented in the application, which may allow for rapid conversion of applications from platform-specific to platform-agnostic code.

FIG. 4 illustrates further details of operations 330 for generating the abstract syntax tree representation of the workflow based on the intermediate representation of the workflow.

As illustrated, operations 330 may begin at block 410, where a system identifies variables in the intermediate representation of the workflow based on identifying assignments of values to the identified variables in the intermediate representation of the workflow.

Generally, a variable or other labeled value that is implemented in source code may be recognized by an assignment function, as a variable may not be able to be used safely without at least an initial assignment of a value (as a declared variable without an assignment may essentially be a random block of bits that represents an unknown value). The variables may be identified, for example, using various lexical analyses, such as random expression processing. It should be noted that assignments may be represented in various manners in source code, and thus, the lexical analysis may be configured to recognize these various manners of assigning values to variables. For example, assignments may be identified when the character "=" is encountered in source code or when variables are passed by reference to a function.

At block 420, the system generates a token for each of the variables in the intermediate representation of the workflow. The tokens, as discussed above, may be used in generating the abstract syntax tree representation of the workflow.

At block 430, the system generates a tree data structure based on an order in which operations are defined in the intermediate representation of the workflow. The tree data structure may be generated, for example, as a top-down construct in which the ultimate output of the workflow is represented by the root node in the tree data structure and the predecessor operations used to generate the output of the workflow are represented by children nodes in the tree data structure.

At block 440, the system builds the abstract syntax tree by syntactically analyzing the tokenized representation of the workflow. The abstract syntax tree may be built based on a context-free grammar associated with the knowledge graph-specific language. The context-free grammar generally includes a plurality of rules mapping specific language constructs in the tokenized representation of the workflow to specific actions. The context-free grammar, for example, may associate specific rules and tree structures with specific mathematical primitive operations, logical operations, conditional operations, and/or functions invoked in the source code.

Example System for Generating a Knowledge Graph from Program Source Code

Figure 5:
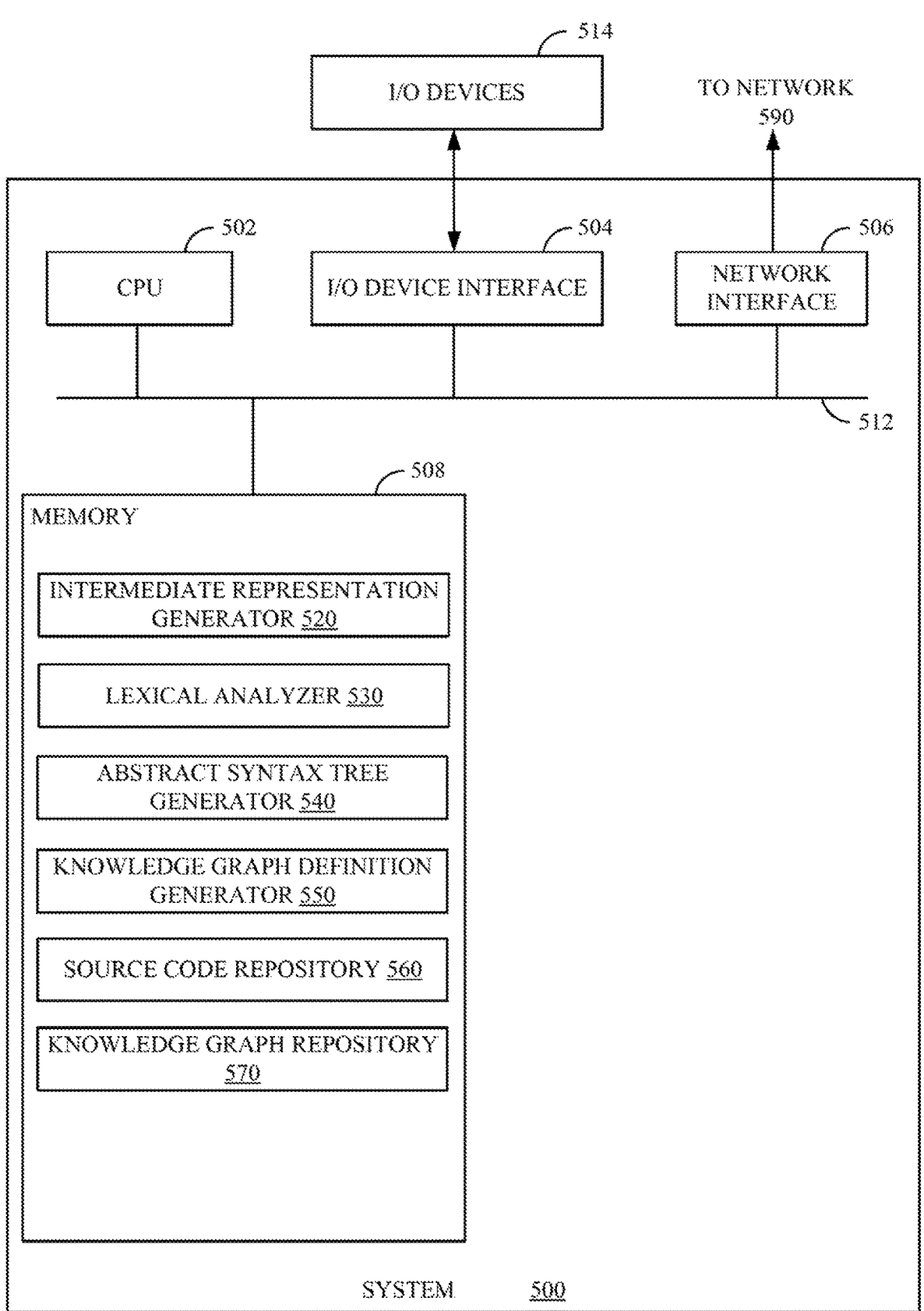
FIG. 5 illustrates an example system on which embodiments of the present disclosure can be performed.

FIG. 5 illustrates an example system 500 that can generate a knowledge graph definition of a workflow from program source code. For example, system 500 may comprise knowledge graph generator 110 illustrated in FIG. 1.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, storage 510, and an interconnect 512. CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 505, memory 508, and storage 510.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like.

As shown, memory 508 includes an intermediate representation generator 520 (which may correspond to intermediate representation generator 112 illustrated in FIG. 1), lexical analyzer 530 (which may correspond to lexical analyzer 114 illustrated in FIG. 1), abstract syntax tree generator 540 (which may correspond to abstract syntax tree generator 116 illustrated in FIG. 1), a knowledge graph definition generator 550 (which may correspond to knowledge graph definition generator 118 illustrated in FIG. 1), a source code repository 560 (which may correspond to source code repository 130 illustrated in FIG. 1), and a knowledge graph repository 570 (which may correspond to knowledge graph repository 140 illustrated in FIG. 1). Intermediate representation generator 520 may be configured to receive, as an input, source code defining a workflow for which a knowledge graph is to be generated and generate an intermediate representation of the source code for use in generating the knowledge graph. Intermediate representation generator 520 may generate the intermediate representation by, for example, stripping programming language-specific constructs from the program source code, rewriting the source code to comply with a single assignment per variable paradigm, and the like.

Lexical analyzer 530 may parse the intermediate representation of the source code to tokenize variables in the source code. As discussed, the intermediate representation of the source code may be tokenized based on regular expression processing of the intermediate representation of the source code.

Abstract syntax tree generator 540 may be implemented as a compiler that uses the tokens identified by lexical analyzer 530 and the intermediate representation of the source code to generate a tree definition of the workflow. The tree definition of the workflow may be generated using a context-free grammar and in relation to calculation graph definitions of various mathematical, logical, comparison, and function invocation operations in a workflow. Generally, the tree definition of the workflow may be generated as a top-down construct in which the output of the workflow is represented by the root node of the abstract syntax tree, and intermediate operations are represented by successively lower nodes in the abstract syntax tree.

Knowledge graph definition generator 550 generally traverses the abstract syntax tree to generate a knowledge graph definition of the workflow as a structured file in a knowledge graph-specific language. The knowledge graph definition may be generated as a top-down traversal starting from the root node of the abstract syntax tree to the bottom of the abstract syntax tree and successively generating content in the structured file from the bottom of the abstract syntax tree to the root node of the abstract syntax tree.

Source code repository 560 generally stores source code definitions of various workflows for which knowledge graphs are to be generated. Knowledge graph repository 570 generally represents a data repository in which knowledge graphs defining functions executed within an application are defined. These knowledge graphs may be committed to knowledge graph repository 570 by knowledge graph definition generator 550 as they are generated, and users can edit these knowledge graphs after they are generated and before they are deployed to a knowledge graph execution engine for use in a testing or production environment.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. §112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for generating a knowledge graph definition from program source code, comprising:

receiving a source code definition of a workflow implemented in an application;

converting the source code definition of the workflow into an intermediate representation of the workflow, the intermediate representation comprising a condensed version of the source code definition;

generating an abstract syntax tree representation of the workflow based on the intermediate representation of the workflow;

generating a structured file by:

traversing the abstract syntax tree representation of the workflow recursively until reaching a bottom of the abstract syntax tree representation;

identifying, based on the reaching of the bottom of the abstract syntax tree representation, operations that are to be invoked in the workflow using a knowledge graph definition generator; and writing the structured file from the bottom of the abstract syntax tree representation to a root node of the abstract syntax tree representation based on the identifying of the operations that are to be invoked in the workflow, wherein the structured file comprises a definition of the workflow in a knowledge graph-specific language readable by a knowledge graph execution engine, wherein the knowledge graph-specific language comprises a declarative construct that is decoupled from programmatic and platform-related constraints associated with a programming language of the source code definition of the workflow; and deploying the structured file to the knowledge graph execution engine.

2. The method of claim 1, wherein converting the source code definition of the workflow into the intermediate representation of the workflow comprises removing programming language-specific constructs from the source code definition of the workflow.

3. The method of claim 1, wherein converting the source code definition of the workflow into the intermediate representation of the workflow comprises removing loop structures from the source code definition of the workflow.

4. The method of claim 1, wherein converting the source code definition of the workflow into the intermediate representation of the workflow comprises rewriting the source code definition such that a value is assigned to a variable in the source code definition once regardless of a number of assignments that are made to the variable in the source code definition.

5. The method of claim 1, wherein generating the abstract syntax tree representation of the workflow comprises:

tokenizing the intermediate representation of the workflow based on a lexical analysis of the intermediate representation; and building the abstract syntax tree by syntactically analyzing the tokenized intermediate representation of the workflow based on a context-free grammar associated with the knowledge graph-specific language.

6. The method of claim 5, wherein tokenizing the intermediate representation of the workflow comprises:

identifying one or more variables in the intermediate representation of the workflow based on identifying assignments of values to the one or more variables in the intermediate representation of the workflow; and generating a token for each of the one or more variables in the intermediate representation of the workflow.

7. The method of claim 5, wherein building the abstract syntax tree comprises:

generating a tree data structure based on an order in which operations are defined in the intermediate representation of the workflow such that an output of a function is represented as a root node of the abstract syntax tree.

8. The method of claim 7, wherein:

nodes in the tree data structure represent an operation of a plurality of operations defined in the context-free grammar associated with the knowledge graph-specific language, and the plurality of operations comprise mathematical primitive operations/logical operations/conditional operations defined in a programming language and function calls in the application.

9. The method of claim 1, wherein:

generating the structured file comprises translating each node in the abstract syntax tree to a node in a calculation graph, and nodes in the calculation graph represent operations or inputs into an operation performed to execute the workflow.

10. The method of claim 1, wherein generating the structured file comprises recursively traversing the abstract syntax tree such that operations defined at a lowest level of the abstract syntax tree are defined first in the structured file.

11. The method of claim 1, wherein the structured file includes labels associated with variables defined in the program source code.

12. The method of claim 11, further comprising: replacing the labels associated with variables defined in the program source code with corresponding labels in a data model associated with the knowledge graph execution engine.

13. A system, comprising:

a processor; and a memory having instructions stored thereon which, when executed by the processor, performs an operation for generating a knowledge graph from program source code, the operation comprising:

receiving a source code definition of a workflow implemented in an application;

converting the source code definition of the workflow into an intermediate representation of the workflow, the intermediate representation comprising a condensed version of the source code definition;

generating an abstract syntax tree representation of the workflow based on the intermediate representation of the workflow;

generating a structured file by:

traversing the abstract syntax tree representation of the workflow recursively until reaching a bottom of the abstract syntax tree representation;

identifying, based on the reaching of the bottom of the abstract syntax tree representation, operations that are to be invoked in the workflow using a knowledge graph definition generator; and writing the structured file from the bottom of the abstract syntax tree representation to a root node of the abstract syntax tree representation based on the identifying of the operations that are to be invoked in the workflow, wherein the structured file comprises a definition of the workflow in a knowledge graph-specific language readable by a knowledge graph execution engine, wherein the knowledge graph-specific language comprises a declarative construct that is decoupled from programmatic and platform-related constraints associated with a programming language of the source code definition of the workflow; and deploying the structured file to the knowledge graph execution engine.

14. The system of claim 13, wherein converting the source code definition of the workflow into the intermediate representation of the workflow comprises one or more of:

removing programming language-specific constructs from the source code definition of the workflow;

removing loop structures from the source code definition of the workflow; or rewriting the source code definition such that a value is assigned to a variable in the source code definition once regardless of a number of assignments that are made to the variable in the source code definition.

15. The system of claim 13, wherein generating the abstract syntax tree representation of the workflow comprises:

tokenizing the intermediate representation of the workflow based on a lexical analysis of the intermediate representation; and building the abstract syntax tree by syntactically analyzing the tokenized intermediate representation of the workflow based on a context-free grammar associated with the knowledge graph-specific language.

16. The system of claim 15, wherein tokenizing the intermediate representation of the workflow comprises:

identifying one or more variables in the intermediate representation of the workflow based on identifying assignments of values to the one or more variables in the intermediate representation of the workflow; and generating a token for each of the one or more variables in the intermediate representation of the workflow.

17. The system of claim 15, wherein building the abstract syntax tree comprises:

generating a tree data structure based on an order in which operations are defined in the intermediate representation of the workflow such that an output of a function is represented as a root node of the abstract syntax tree.

18. The system of claim 17, wherein:

nodes in the tree data structure represent an operation of a plurality of operations defined in the context-free grammar associated with the knowledge graph-specific language, and the plurality of operations comprise mathematical primitive operations/logical operations/conditional operations defined in a programming language and function calls in the application.

19. The system of claim 18, wherein:

generating the structured file comprises translating each node in the abstract syntax tree to a node in a calculation graph, and nodes in the calculation graph represent operations or inputs into an operation performed to execute the workflow.

20. A method for generating a knowledge graph definition from program source code, comprising:

receiving a source code definition of a workflow implemented in an application;

converting the source code definition of the workflow into an intermediate representation of the workflow, the intermediate representation comprising a condensed version of the source code definition;

generating an abstract syntax tree representation of the workflow based on the intermediate representation of the workflow by:

tokenizing the intermediate representation of the workflow based on a lexical analysis of the intermediate representation; and building the abstract syntax tree by syntactically analyzing the tokenized intermediate representation of the workflow based on a context-free grammar associated with knowledge graph-specific language to generate a tree data structure based on an order in which operations are defined in the intermediate representation of the workflow such that an output of a function is represented as a root node of the abstract syntax tree, wherein:

nodes in the tree data structure represent an operation of a plurality of operations defined in the context-free grammar associated with the knowledge graph-specific language, the plurality of operations comprise mathematical primitive operations/logical operations/conditional operations defined in a programming language and function calls in the application, and the knowledge graph-specific language comprises a declarative construct that is decoupled from programmatic and platform-related constraints associated with a programming language of the source code definition of the workflow;

generating a structured file by:

traversing the abstract syntax tree representation of the workflow recursively until reaching a bottom of the abstract syntax tree representation;

identifying, based on the reaching of the bottom of the abstract syntax tree representation, operations 5 that are to be invoked in the workflow using a knowledge graph definition generator; and writing the structured file from the bottom of the abstract syntax tree representation to a root node of the abstract syntax tree representation based on 10 the identifying of the operations that are to be invoked in the workflow, wherein the structured file comprises a definition of the workflow in the knowledge graph-specific language readable by a knowledge graph execution engine; and 15 deploying the structured file to the knowledge graph execution engine.

\* \* \* \* \*